(12) United States Patent
Kobayashi et al.

(10) Patent No.: US 8,241,808 B2
(45) Date of Patent: Aug. 14, 2012

(54) FUEL CELL SYSTEM FOR SUPPLYING GAS IN ACCORDANCE WITH LOAD OF THE FUEL CELL

(75) Inventors: Tomoyoshi Kobayashi, Toyota (JP); Norio Yamagishi, Aichi (JP); Takashi Mishima, Gujo (JP); Munetoshi Kuroyanagi, Aichi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1194 days.

(21) Appl. No.: 11/579,945

(22) PCT Filed: May 26, 2005

(86) PCT No.: PCT/JP2005/010086
§ 371 (c)(1),
(2), (4) Date: Dec. 26, 2007

(87) PCT Pub. No.: WO2005/117181
PCT Pub. Date: Dec. 8, 2005

(65) Prior Publication Data
US 2008/0199746 A1 Aug. 21, 2008

(30) Foreign Application Priority Data
May 28, 2004 (JP) ................................. 2004-158697

(51) Int. Cl.
*H01M 8/04* (2006.01)
(52) U.S. Cl. ........................................ 429/444; 429/513
(58) Field of Classification Search .................. None
See application file for complete search history.

(56) References Cited

U.S. PATENT DOCUMENTS

| 5,441,821 A | 8/1995 | Merritt et al. |
| 6,670,067 B2 | 12/2003 | Sato et al. |
| 6,706,438 B2 | 3/2004 | Sahoda et al. |

(Continued)

FOREIGN PATENT DOCUMENTS

EP 0 800 708 B1 2/2000
(Continued)

OTHER PUBLICATIONS

U.S. Appl. No. 10/589,749, Yamagishi et al., filed Aug. 17, 2006.

*Primary Examiner* — Barbara Gilliam
*Assistant Examiner* — Stephan Essex
(74) *Attorney, Agent, or Firm* — Oliff & Berridge, PLC

(57) ABSTRACT

An object is to provide a fuel cell system having a simple structure, which is capable of supplying gas appropriately through an ejector in accordance with the load of a fuel cell. The fuel cell system (1) uses an ejector (24) disposed in a gas supply system (4) to combine a new gas to be supplied to the fuel cell (2) with an off-gas discharged from the fuel cell (2) and supply the fuel cell (2) with the resulting combined gas. The ejector (24) includes a nozzle (46) for ejecting the new gas and generating a negative pressure for aspirating the off-gas, and a flow rate control mechanism (47) for controlling the flow rate of the new gas which passes through the nozzle (46). A first flow path (81) for leading the off-gas to the flow rate control mechanism (47) is provided in the gas supply system (4), and the flow rate control mechanism (47) controls the flow rate of the new gas in accordance with the pressure of the off-gas led from the first flow path (81).

7 Claims, 8 Drawing Sheets

U.S. PATENT DOCUMENTS

| | | |
|---|---|---|
| 2002/0022172 A1 | 2/2002 | Sahoda et al. |
| 2002/0106547 A1* | 8/2002 | Sugawara et al. ............... 429/34 |
| 2005/0064255 A1* | 3/2005 | Blaszczyk et al. ............... 429/19 |
| 2007/0163649 A1 | 7/2007 | Yamagishi et al. |

FOREIGN PATENT DOCUMENTS

| | | |
|---|---|---|
| JP | A 8-338398 | 12/1996 |
| JP | A 9-213353 | 8/1997 |
| JP | A 2002-56868 | 2/2002 |
| JP | A 2002-56869 | 2/2002 |
| JP | A 2002-56870 | 2/2002 |
| JP | A 2002-227799 | 8/2002 |
| JP | A-2004-146098 | 5/2004 |
| WO | WO 2004/038838 A2 | 5/2004 |

* cited by examiner

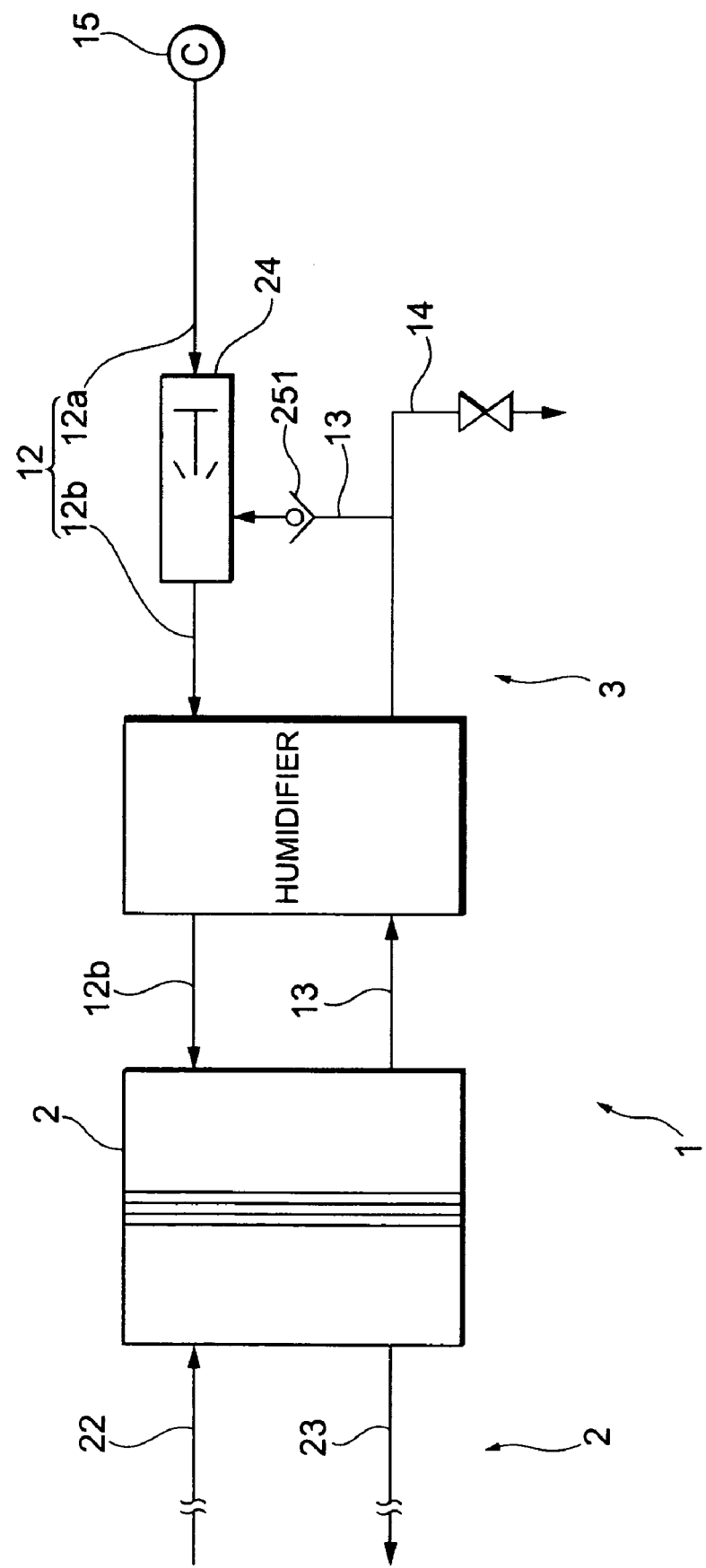

FUEL CELL SYSTEM FOR SUPPLYING GAS IN ACCORDANCE WITH LOAD OF THE FUEL CELL

BACKGROUND

The present invention relates to a fuel cell system having an ejector which combines a new gas to be supplied to a fuel cell with a gas discharged from the fuel cell and supplies the combined gas to the fuel cell.

In a known conventional example of this type of fuel cell system, the ejector is constituted to be capable of varying a gas flow rate so that the gas can be supplied in accordance with the load of the fuel cell. For example, a fuel cell system described in Japanese Patent Laid-open Publication No.2002-56870 (pages 4 to 6, FIG. 2) includes two ejectors corresponding to predetermined hydrogen gas flow rates, and the two ejectors are switched arbitrarily by an actuator based on the output current of the fuel cell. In a fuel cell system described in Japanese Patent Laid-open Publication No.H9-213353 (page 3 and FIG. 1), the opening of a fuel supply valve of the ejector is adjusted arbitrarily on the basis of the detection results of a plurality of pressure or flow rate sensors disposed in a hydrogen gas supply system.

However, with this type of conventional fuel cell system, an actuator or sensor is provided to vary the flow rate using the ejector, and hence control of the entire system becomes complicated. The controllability (resolution) of the actuator and so on may be increased to solve this problem, but this may lead to a cost increase.

SUMMARY

An object of the present invention is to provide a fuel cell system having a simple structure, which is capable of supplying gas appropriately in accordance with the load of a fuel cell.

To achieve this object, a fuel cell system of the present invention comprises an ejector that is disposed in a gas supply system, combines a new gas to be supplied to a fuel cell with a gas discharged from the fuel cell, and supplies the fuel cell with a resulting combined gas. The ejector comprises a nozzle for ejecting the new gas and generating a negative pressure for aspirating the gas discharged from the fuel cell, and a flow rate control mechanism for controlling a flow rate of the new gas which passes through the nozzle. The gas supply system includes a first flow path for leading the gas, which is discharged from the fuel cell and flows between the fuel cell and the ejector, to the flow rate control mechanism. The flow rate control mechanism controls the flow rate of the new gas in accordance with a pressure of the gas led from the first flow path.

According to this constitution, the flow rate of the new gas that passes through the nozzle is controlled by the flow rate control mechanism, and this control is performed in accordance with the gas that is discharged from the fuel cell, which is referred to mainly hereafter as off-gas. Hence, the control of the flow rate control mechanism can be performed mechanically, and therefore electric actuators, sensors, and the like need not be provided. Further, since the pressure of the off-gas is used effectively, an appropriate amount of gas can be supplied in accordance with the load of the fuel cell. In particular, since the gas that is led to the flow rate control mechanism is off-gas, the outlet pressure of the fuel cell, which exhibits a high degree of pressure change responsiveness to variation in the amount of gas consumed by the fuel cell, acts on the ejector. As a result, the new gas can be supplied with favorable responsiveness when the consumption amount varies.

If the gas is hydrogen gas serving as a fuel, for example, the term "gas supply system" refers to a series of objects relating to the hydrogen gas (through which hydrogen gas flows). The term "gas supply system" includes a gas supply source (a hydrogen tank, for example) and gas passages within the fuel cell. The gas supply system may be an oxygen gas supply system or a hydrogen gas supply system.

In this case, the gas supply system preferably includes a second flow path which leads the new gas to the flow rate control mechanism, and the flow rate control mechanism preferably controls the flow rate of the new gas in accordance with a differential pressure of the gas from the first flow path and the gas from the second flow path.

Similarly, the gas supply system preferably includes a second flow path which leads the combined gas to be supplied to the fuel cell to the flow rate control mechanism, and the flow rate control mechanism preferably controls the flow rate of the new gas in accordance with a differential pressure of the gas from the first flow path and the gas from the second flow path.

According to these constitutions, the control of the flow rate control mechanism can be performed in accordance with the differential pressure between the new gas and the off-gas or combined gas.

In these cases, the flow rate control mechanism preferably comprises a needle having a tip end side which faces an opening portion of the nozzle, a piston which is connected to a base end side of the needle and has a front surface side to which the gas from one of the first flow path and the second flow path is led and has a rear surface side to which the gas from the other of the first flow path and the second flow path is led, and a biasing member for biasing the rear surface side of the piston toward the tip end side of the needle. The needle preferably advances and retreats axially on the basis of a balance between the differential pressure of the gases on the piston and a biasing force of the biasing member, thereby varying an opening area of the nozzle.

According to this constitution, when the needle retreats axially, for example, the surface area of a gap between the needle and the opening portion of the nozzle increases, and the flow rate of the new gas that is ejected through this gap rises. Conversely, when the needle advances axially, the surface area of the gap decreases, and the flow rate of the ejected new gas falls. The advancement and retreat of the needle for varying the opening area of the nozzle is based on the balance between the differential pressure and biasing force that act on the piston. Hence, the flow rate of the new gas that passes through the nozzle can be controlled appropriately by means of a simple constitution.

In these cases, the nozzle is preferably provided in a plurality corresponding to the flow rate of the new gas, and the flow rate control mechanism preferably controls the flow rate of the new gas by switching the nozzles in accordance with the differential pressure to select one or a plurality of nozzles through which transmission of the new gas is permitted.

According to this constitution, the plurality of nozzles are set to be suitable for various flow rate regions of the new gas, and therefore the flow rate of the new gas that passes through the nozzle can be controlled appropriately by simply switching the nozzle for guiding the new gas appropriately in accordance with the differential pressure.

In these cases, the first flow path preferably is connected to a circulation passage which is disposed between the fuel cell and the ejector, and a passage sectional area of the first flow path is preferably set to be smaller than that of the circulation passage.

According to this constitution, the flow rate of the off-gas that is aspirated by the nozzle of the ejector can be held at an appropriate level while leading the off-gas to the flow rate control mechanism of the ejector appropriately.

According to the fuel cell system of the present invention described above, flow rate control is performed by an ejector in accordance with the pressure of a gas that is discharged from a fuel cell, and since this control does not necessarily require various electrical constitutions, gas corresponding to the load of the fuel cell can be supplied appropriately by means of a simple constitution.

DESCRIPTION OF THE DRAWINGS

FIG. 8 is a block diagram showing the constitution of a fuel cell system according to a seventh embodiment.

DETAILED DESCRIPTION

A fuel cell system according to preferred embodiments of the present invention will be described below with reference to the attached drawings. The fuel cell system comprises a variable flow rate type ejector, and is used to supply gas in accordance with the load of a fuel cell using the ejector to control the flow rate of the gas mechanically (autonomously). First, an example in which the ejector is disposed in a hydrogen gas supply system will be described. Description will be provided using an example of a fuel cell system installed in a fuel cell vehicle.

[First Embodiment]

Figure 1:
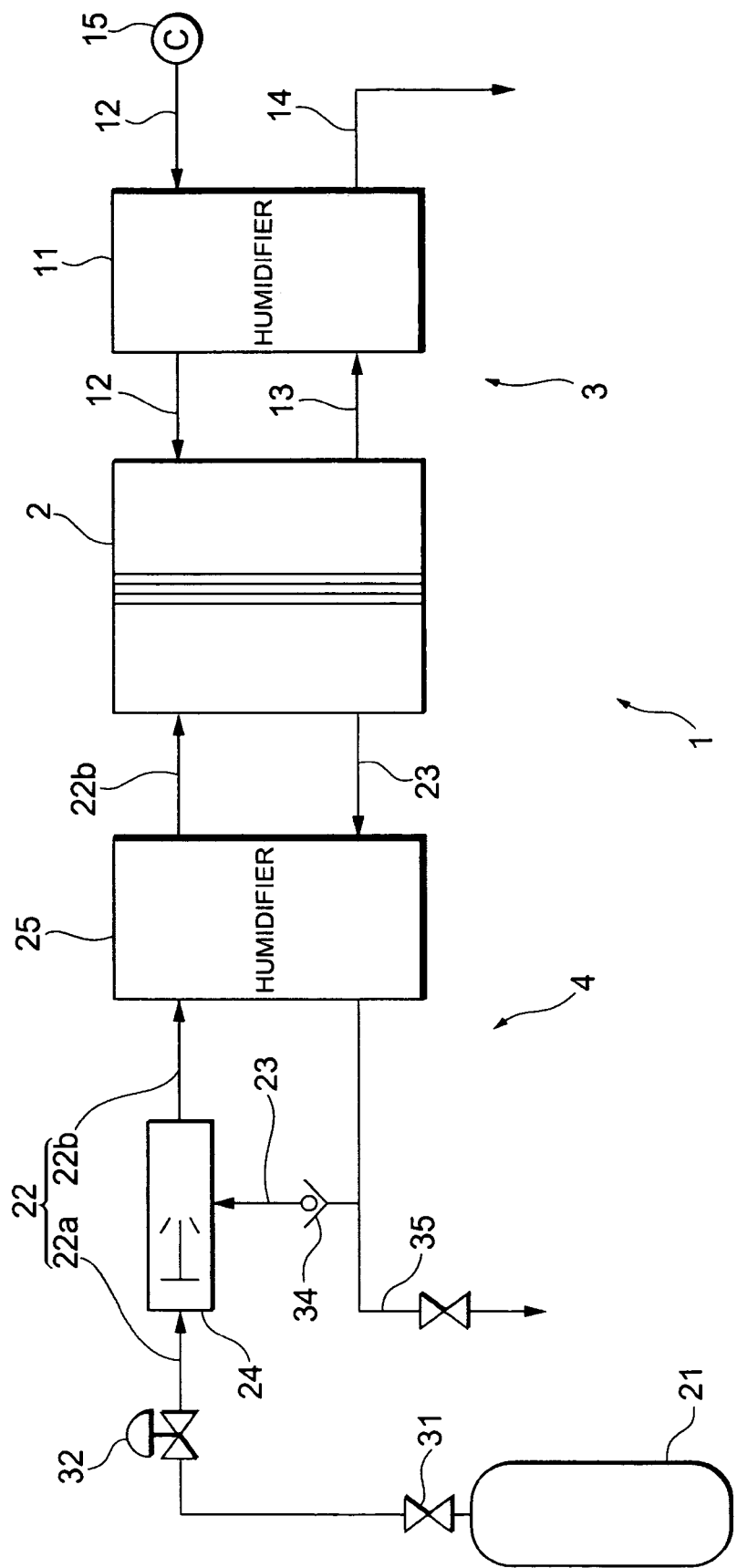
FIG. 1 is a block diagram showing the constitution of a fuel cell system according to a first embodiment.

As shown in FIG. 1, a fuel cell system 1 comprises a solid polymer electrolyte fuel cell 2 which generates electric power upon reception of a supply of oxygen gas (air) and hydrogen gas (fuel gas). The fuel cell 2 is constituted in a stack structure comprising a large number of laminated cells. The fuel cell system 1 includes an oxygen gas supply system 3 for supplying the fuel cell 2 with oxygen gas, and a hydrogen gas supply system 4 for supplying the fuel cell 2 with hydrogen gas.

The oxygen gas supply system 3 includes a supply passage 12 for supplying the fuel cell 2 with oxygen gas that has been humidified by a humidifier 11, a circulation passage 13 for leading oxygen off-gas discharged from the fuel cell 2 to the humidifier 11, and a discharge passage 14 for leading the oxygen off-gas from the humidifier 11 to a combustor. The supply passage 12 is provided with a compressor 15 which takes in oxygen gas from the atmosphere and pumps the oxygen gas to the humidifier 11.

The hydrogen gas supply system 4 includes a hydrogen tank 21 which serves as a hydrogen supply source storing high-pressure hydrogen gas, a supply passage 22 for supplying the fuel cell 2 with the hydrogen gas in the hydrogen tank 21, a circulation passage 23 for returning hydrogen off-gas discharged from the fuel cell 2 to the supply passage 22, and an ejector 24 for circulating the hydrogen off-gas in the circulation passage 23 to the supply passage 22. New hydrogen gas from the hydrogen tank 21 is combined with the hydrogen off-gas by the ejector 24, and the combined mixed gas is supplied to the fuel cell 2.

The supply passage 22 is constituted by a main flow passage 22a positioned on the upstream side of the ejector 24, which serves as a passage for leading new hydrogen gas to the ejector 24, and a mixture passage 22b positioned on the downstream side of the ejector 24, which serves as a passage for leading the mixed gas to the fuel cell 2 via a humidifier 25. A shut valve 31 for opening and closing the main flow passage 22a and a regulating valve 32 for adjusting the pressure of the hydrogen gas are interposed on the main flow passage 22a in sequence from the upstream side.

The humidifier 25 is interposed so as to straddle the mixture passage 22b and the circulation passage 23, and performs moisture exchange between the mixed gas and hydrogen off-gas. As a result, appropriately humidified mixed gas is supplied to the fuel cell 2. A check valve 34 is interposed on the circulation passage 23 on the downstream side of the humidifier 25, and a discharge passage 35 bifurcates from and is connected to the circulation passage 23 on the downstream side of the humidifier 25. The hydrogen off-gas in the circulation passage 23 is aspirated into the ejector 24 through the check valve 34. Note that a structure omitting the humidifier 25 and check valve 34 may be employed.

Figure 2:
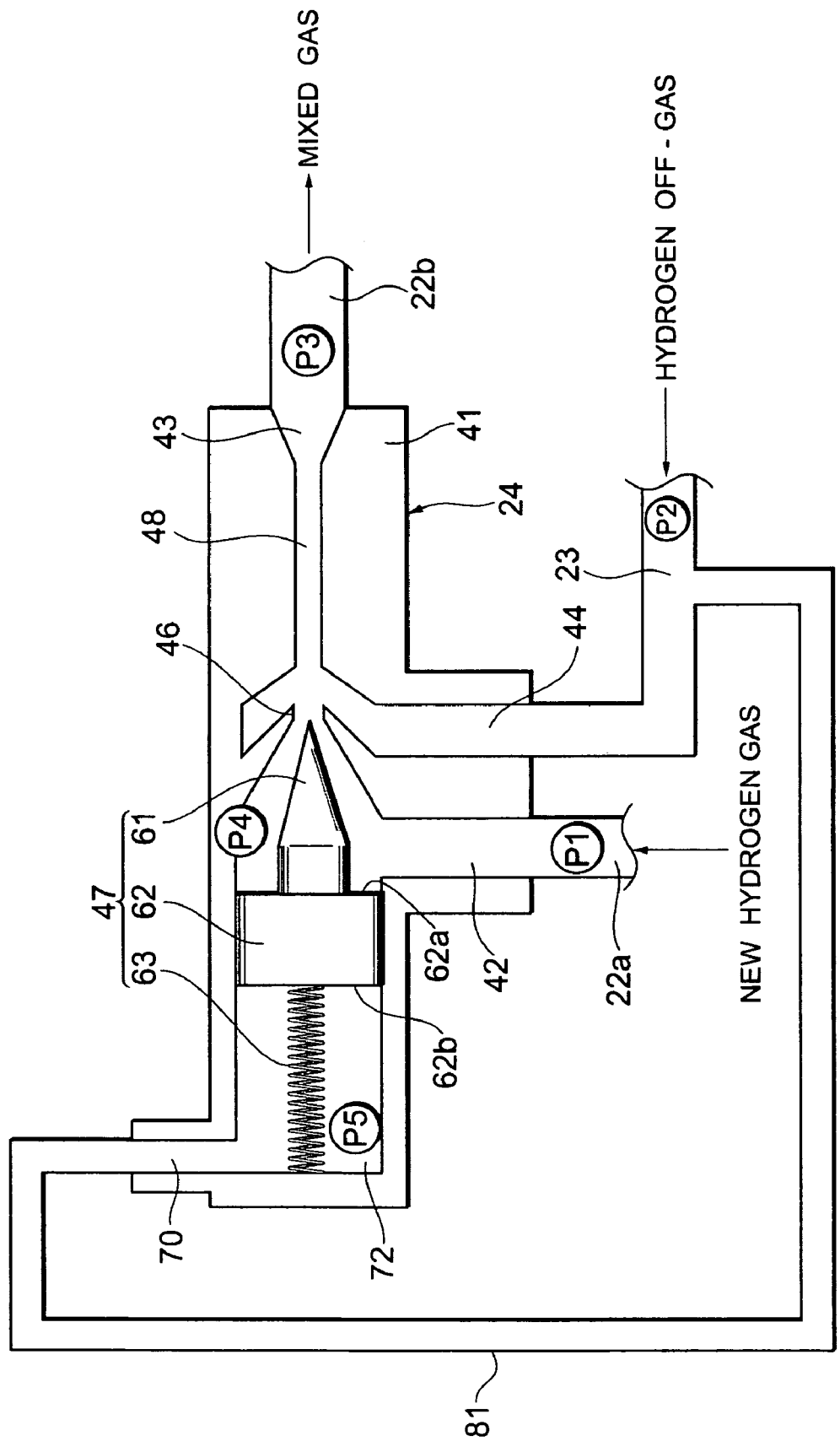
FIG. 2 is a simplified block diagram showing the main parts of the fuel cell system according to the first embodiment.

The ejector 24 is structured to be capable of varying the flow rate of the hydrogen gas (mixed gas) supplied to the fuel cell 2. As shown in FIG. 2, the ejector 24 includes a casing 41 constituting an outer shell thereof. The casing 41 is formed with a primary side supply port 42 connected to the downstream side of the main flow passage 22a, a secondary side discharge port 43 connected to the upstream side of the mixture passage 22b, and a negative pressure acting side (tertiary side) suction port 44 connected to the downstream side of the circulation passage 23.

The interior of the casing 41 is formed with a nozzle 46 for ejecting new hydrogen gas toward the downstream side, a flow rate control mechanism 47 which controls the flow rate of the new hydrogen gas that passes through the nozzle 46, and a diffuser 48 provided on the downstream side of the nozzle 46 for combining hydrogen off-gas with the new hydrogen gas that passes through the nozzle 46. The nozzle 46 is a so-called tapered nozzle. More specifically, the nozzle 46 is formed so as to taper in the hydrogen gas flow direction, and a tip end portion thereof opens onto the diffuser 48 side. The widened base end side of the nozzle 46 is linked to the primary side supply port 42.

The diffuser 48 is formed coaxial with the nozzle 46, and an upstream side thereof in relation to the nozzle 46 is communicated with the tertiary side suction port 44. The downstream side of the diffuser 48 is communicated with the secondary side discharge port 43. When new hydrogen gas is ejected through the nozzle 46 toward the diffuser 48, a negative pressure for aspirating the hydrogen off-gas is generated, and thus the hydrogen off-gas in the circulation passage 23 is aspirated into the diffuser 48. As a result, the new hydrogen gas and the hydrogen off-gas are combined and mixed in the diffuser 48, and this mixed gas is discharged to the mixture passage 22b from the diffuser 48 via the discharge port 43.

The flow rate control mechanism 47 includes a needle 61 having a tip end side which faces the opening portion of the nozzle 46, a piston 62 connected to a base end side of the needle 61, and a spring 63 (biasing member) disposed on a rear surface side 62b of the piston 62. The needle 61, piston 62, and spring 63 are disposed coaxial with the nozzle 46.

The needle 61 is constituted by a conical or pyramidal body which tapers toward the tip end side thereof, and the tip end portion has a paraboloidal form, for example. The spring 63 has a predetermined spring constant, and is interposed between the rear surface side 62b of the piston 62 and the interior of the casing 41. The spring 63 biases the rear surface side 62b of the piston 62 toward the tip end side of the needle 61.

The piston 62 is supported by its outer periphery on the interior of the casing 41, and is constituted to be capable of sliding axially. The needle 61 is connected to a central portion of a front surface side 62a of the piston 62, and new hydrogen gas from the main flow passage 22a is led through the supply port 42 to the remaining portion of the front surface side 62a of the piston 62. Meanwhile, the spring 63 is connected to a central portion of the rear surface side 62b of the piston 62, and hydrogen off-gas from the circulation passage 23 is led as a signal pressure through a pressure inlet 70 formed in the casing 41 to the remaining portion of the rear surface side 62b of the piston 62.

More specifically, the hydrogen gas supply system 4 is provided with two flow paths (a first flow path and a second flow path) which guide hydrogen gas and hydrogen off-gas to the front and rear surfaces of the piston 62, respectively. The first flow path is constituted by a branch passage 81 which bifurcates from and is connected to the circulation passage 23 and has a smaller passage sectional area than the circulation passage 23. The main flow passage 22a doubles as the second flow path. The branch passage 81 leads to a pressure chamber 72, which is defined by the rear surface side 62b of the piston 62 and the interior of the casing 41, via the pressure inlet 70. Note that the branch passage 81 may be constituted by external piping on the outside of the ejector 24, as shown in the drawing, or by internal piping built into the casing 41 of the ejector 24.

Hence, a pressure P1 of the new hydrogen gas in the main flow passage 22a acts on the front surface side 62a of the piston 62, while a pressure P2 of the hydrogen off-gas in the branch passage 81 and the biasing force of the spring 63 act on the rear surface side 62b of the piston 62. By means of this constitution, the needle 61 advances and retreats axially on the basis of the balance between the differential hydrogen gas pressure on the piston 62 and the biasing force of the spring 63. By causing the needle 61 to advance and retreat, the opening area, which is referred to as the opening area of the nozzle 46 hereafter, of the gap between the needle 61 and the tip end portion of the nozzle 46 can be varied, and as a result, the flow rate of the new hydrogen gas which passes through the nozzle 46 is controlled.

For convenience of description, the pressure of the hydrogen gas on the front surface side 62a of the piston 62 will be referred to as P4, and the pressure of the hydrogen gas in the pressure chamber 72, which acts on the rear surface side 62b of the piston 62, will be referred to as P5. When P4 increases beyond a value obtained by adding the biasing force of the spring 63 to P5, the needle 61 retreats such that the opening area of the nozzle 46 increases, and hence the flow rate of the new hydrogen gas passing through the nozzle 46 rises. Conversely, when P4 falls below the value obtained by adding the biasing force of the spring 63 to P5, the needle 61 advances such that the opening area of the nozzle 46 decreases, and hence the flow rate of the new hydrogen gas passing through the nozzle 46 falls.

Note that the final advancement and retreat positions of needle 61 are regulated to predetermined positions, and when the needle 61 advances to a maximum extent, the outer peripheral surface of the needle 61 abuts against the inner peripheral surface of the nozzle 46 such that the tip end portion of the nozzle 46 is closed. When the needle 61 retreats to a maximum extent, the rear surface side 62b of the piston 62 abuts against a stopper, not shown in the drawing, provided in the pressure chamber 72, and thus the final position of the retreating needle 61 is regulated. Also note that needle moving means for causing the needle 61 to advance and retreat axially are constituted principally by the piston 62, the spring 63, and the two flow paths (22a, 81) for guiding the hydrogen gas in two locations to the piston 62.

Actions of the fuel cell system 1 of this embodiment will now be described, focusing on the relationship thereof to the load of the fuel cell 2. Typically, when the amount of the power generation of the fuel cell 2 increases during acceleration of the fuel cell vehicle or the like, the amount of hydrogen gas consumed by the fuel cell 2 rises. When the consumption amount rises such that the flow rate of the mixture passage 22b increases, pressure loss in the fuel cell 2 increases, and the pressure P2 of the hydrogen off-gas in the circulation passage 23 falls (a pressure P3 of the mixed gas in the mixture passage 22b also falls). At this time, the pressure P5 in the pressure chamber 72 decreases via the branch passage 81. As a result, the piston 62 and needle 61 are caused to retreat from a state of equilibrium against the spring 63 by the balance between P4, P5, and the biasing force of the spring 63.

Thus the opening area of the nozzle 46 increases, causing the flow rate of the new hydrogen gas which passes through the nozzle 46 to rise. Hence, when the load of the fuel cell 2 increases, the ejector 24 responds to this increase appropriately and autonomously. As a result of the increase in the flow rate of the new hydrogen gas, the pressure P3 of the mixed gas rises, and therefore the pressure (i.e. the fuel cell inlet pressure) of the mixed gas that is supplied to the fuel cell 2 is held at an appropriate value. At this time, the flow rate of the hydrogen off-gas rises, and hence the flow rate of the hydrogen off-gas is held at an appropriate value in relation to the flow rate of the new hydrogen gas.

On the other hand, when the amount of the power generation of the fuel cell 2 decreases during start-up, idling, deceleration, and similar operations of the fuel cell vehicle, the amount of hydrogen gas consumed by the fuel cell 2 decreases. When the consumption amount decreases such that the flow rate of the mixture passage 22b falls, pressure loss in the fuel cell 2 decreases, and the pressure P2 of the hydrogen off-gas in the circulation passage 23 rises (the pressure P3 of the mixed gas in the mixture passage 22b also rises). At this time, the pressure P5 in the pressure chamber 72 increases via the branch passage 81. As a result, the piston 62 and needle 61 are caused to advance from a state of equilibrium by the balance between P4, P5, and the biasing force of the spring 63.

Thus the opening area of the nozzle 46 decreases, causing the flow rate of the new hydrogen gas which passes through the nozzle 46 to fall. Hence, when the load of the fuel cell 2 decreases, the ejector 24 responds to this decrease appropriately and autonomously. As a result of the decrease in the flow rate of the new hydrogen off-gas, the pressure P3 of the mixed gas falls, and therefore the pressure of the mixed gas that is supplied to the fuel cell 2 is held at an appropriate value. At this time, the flow rate of the hydrogen off-gas falls, and hence the flow rate of the hydrogen off-gas is held at an appropriate value in relation to the flow rate of the new hydrogen gas.

According to the fuel cell system 1 of this embodiment, as described above, hydrogen gas flow rate control is performed by the ejector 24 in accordance with the differential pressure of the hydrogen gas supply system 4, and therefore the various electrical structures required conventionally to perform this flow rate control are not needed, enabling an overall simplification of the system. Moreover, an appropriate amount of hydrogen gas can be supplied to the fuel cell 2 in accordance with the load of the fuel cell 2. In particular, since the gas that is led to the flow rate control mechanism 47 is hydrogen off-gas, a pressure (i.e. the fuel cell outlet pressure) having a high degree of pressure change responsiveness to the load of the fuel cell 2 acts on the ejector 24. Thus, the responsiveness of the new hydrogen gas supply amount rises when the hydrogen gas consumption amount varies.

[Second Embodiment]

Figure 3:
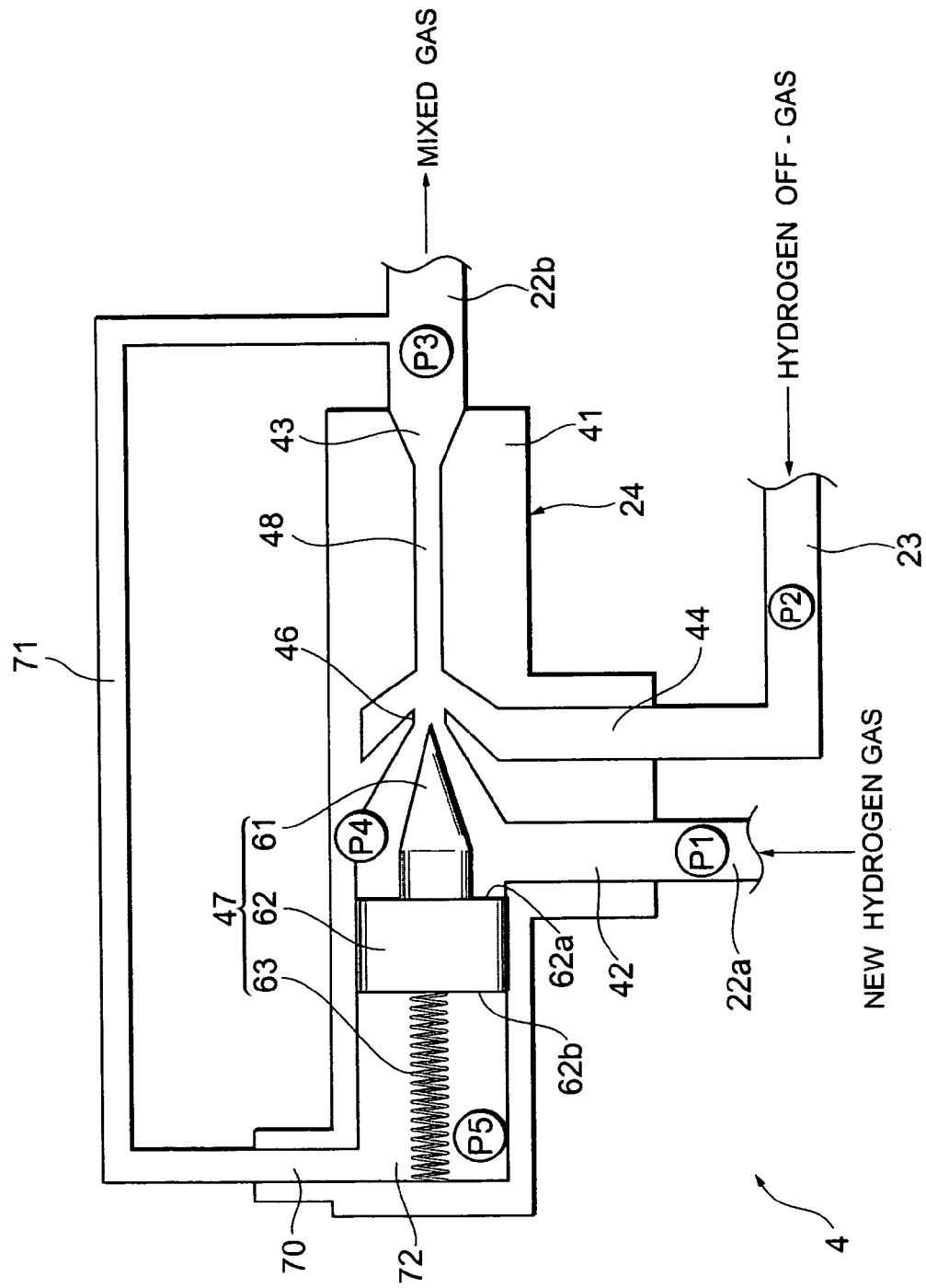
FIG. 3 is a simplified block diagram showing the main parts of a fuel cell system according to a second embodiment.

Next, referring to FIG. 3, a second embodiment of the fuel cell system 1 will be described, focusing on differences with the first embodiment. In second embodiment, mixed gas is led to the flow rate control mechanism 47 instead of hydrogen off-gas. More specifically, a branch passage 71 having a smaller passage sectional area than the circulation passage 23 bifurcates from and is connected to the circulation passage 23, and this branch passage 71 leads to the pressure chamber 72 via the pressure inlet 70. Accordingly, the pressure P3 of the mixed gas in the branch passage 71 and the biasing force of the spring 63 act on the rear surface side 62b of the piston 62.

As described above, when the amount of the power generation of the fuel cell 2 increases such that the pressure P3 of the mixed gas falls, the pressure P5 in the pressure chamber 72 is reduced via the branch passage 71. As a result, similarly to the first embodiment, the needle 61 can be caused to retreat by the balance between P4, P5, and the biasing force of the spring 63. Conversely, when the amount of the power generation of the fuel cell 2 decreases such that the pressure P3 of the mixed gas rises, the pressure P5 in the pressure chamber 72 is increased via the branch passage 71. As a result, the needle 61 can be caused to advance by the balance between P4, P5, and the biasing force of the spring 63.

Thus, the flow rate control mechanism 47 can be operated in accordance with the pressure of the mixed gas, and therefore, similarly to the embodiment described above, an appropriate amount of hydrogen gas can be supplied to the ejector 24 in accordance with the load of the fuel cell 2. Note that similarly to the first embodiment, the branch passage 71 may be constituted by external piping on the outside of the ejector 24 or internal piping built into the casing 41 of the ejector 24.

[Third Embodiment]

Figure 4:
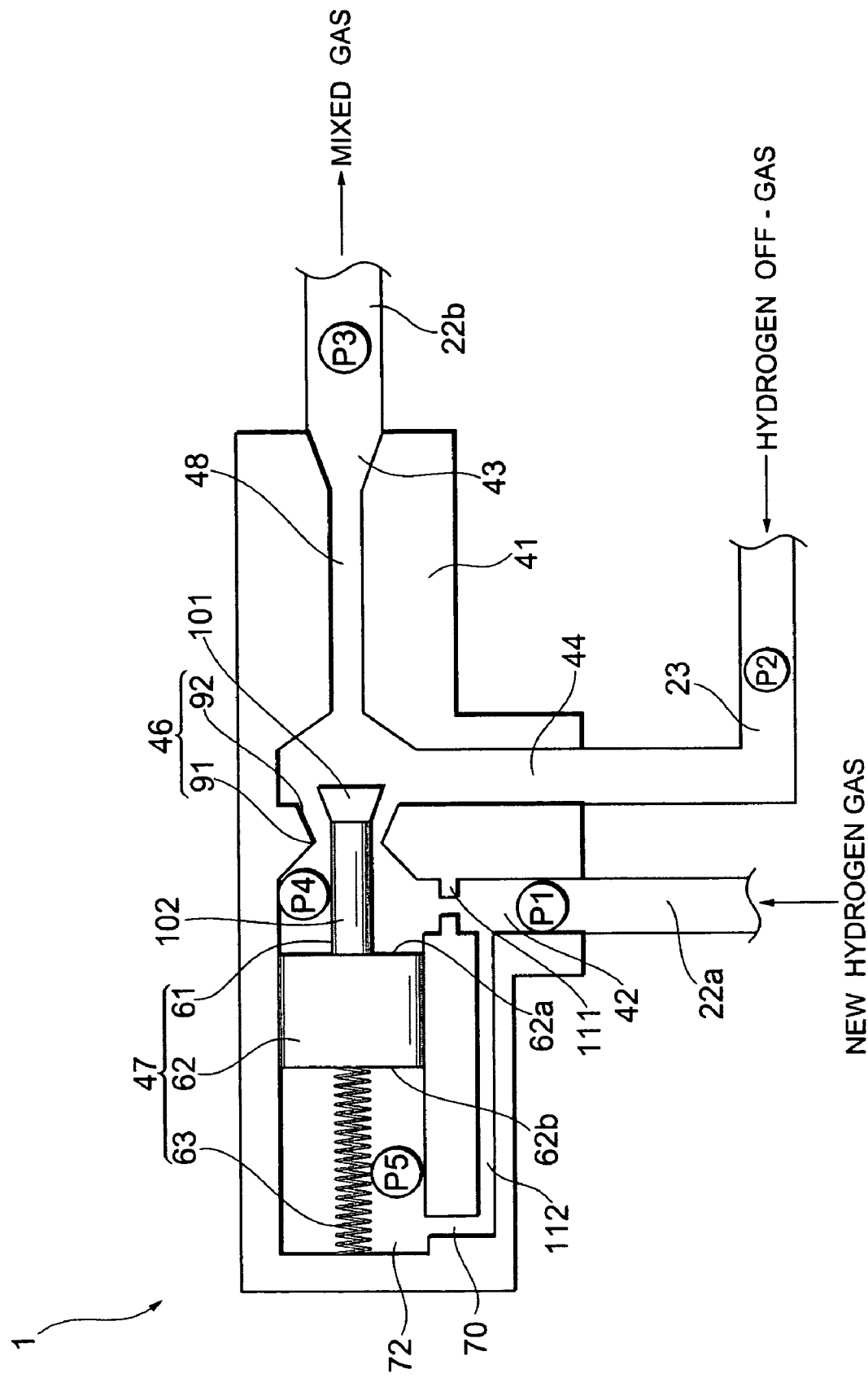
FIG. 4 is a simplified block diagram showing the main parts of a fuel cell system according to a third embodiment.

Next, referring to FIG. 4, a third embodiment of the fuel cell system 1 will be described, focusing on differences with the first embodiment. In third embodiment, the pressure of the hydrogen gas that is led to the flow rate control mechanism 47 are the pressure of the new hydrogen gas in the upstream vicinity of the nozzle 46, and the pressure of the new hydrogen gas in a different position further upstream. Hence, both the structure of the branch passage and the structure of the nozzle 46 and needle 61 differ from the first embodiment.

The nozzle 46 is a so-called divergent nozzle constituted such that the opening area (to be referred to hereafter as the opening area of the nozzle 46, as above) of a gap between a throat portion 91 of the nozzle 46 and the needle 61 can be varied by causing the needle 61 to advance and retreat. A tip end portion 101 of the needle 61 widens in a funnel shape toward the tip end, and faces an opening portion 92 and the throat portion 91 of the nozzle 46 from the downstream side of the nozzle 46.

In this embodiment, the tip end portion 101 approaches the throat portion 91 of the nozzle 46 when the needle 61 retreats, thereby reducing the opening area of the nozzle 46. On the other hand, when the needle 61 advances, the tip end portion 101 moves away from the throat portion 91 of the nozzle 46, and therefore the opening area of the nozzle 46 increases. Note that a maximum value of the opening area of the nozzle 46 is a value obtained by subtracting the sectional area of a shaft-form main body portion 102 of the nozzle 46, which is linked to the tip end portion 101, from the sectional area of the throat portion 91.

A throttle portion 111 which throttles the flow rate of the new hydrogen gas is provided in the interior of the casing 41 on the downstream side of the main flow passage 22a. Having passed through the throttle portion 111, the new hydrogen gas is supplied to the nozzle 46 and the front surface side 62a of the piston 62. Therefore, the pressure P4 of the new hydrogen gas that has passed through the throttle portion 111 acts on the front surface side 62a of the piston 62.

A branch passage 112 having a smaller passage sectional area than the main flow passage 22a bifurcates from and is connected to the main flow passage 22a on the upstream side of the throttle portion 111, and this branch passage 112 leads to the pressure chamber 72 via the pressure inlet 70. Hence, the pressure P1 of the new hydrogen gas in the branch passage 112 and the biasing force of the spring 63 act on the rear surface side 62b of the piston 62. A pressure difference occurs between the pressures P1, P4 of the new hydrogen gas on either side of the throttle portion 111. In this embodiment, this differential pressure is varied according to the flow rate of the new hydrogen gas, and the needle 61 is caused to advance and retreat by the piston 62 in accordance with this differential pressure.

More specifically, when the amount of the power generation of the fuel cell 2 increases, the differential pressure between P1 and P4 increases, and at this time, the differential pressure between the pressure P5 in the pressure chamber 72 and P4 also increases via the branch passage 112. When the pressure of P4 falls below a value obtained by adding the biasing force of the spring 63 to P5, the needle 61 advances in accordance with the balance therebetween. As a result, the opening area of the nozzle 46 increases, and the flow rate of the new hydrogen gas passing through the nozzle 46 rises.

On the other hand, when the amount of the power generation of the fuel cell 2 decreases, the differential pressure between P1 and P4 decreases, and at this time, the differential pressure between the pressure P5 in the pressure chamber 72 and P4 also decreases via the branch passage 112. When the pressure of P4 rises beyond a value obtained by adding the biasing force of the spring 63 to P5, the needle 61 retreats in accordance with the balance therebetween. As a result, the opening area of the nozzle 46 decreases, and the flow rate of the new hydrogen gas passing through the nozzle 46 falls.

Hence in this embodiment also, flow rate control can be performed independently by the ejector 24 in accordance with the differential pressure of the hydrogen gas supply system 4, and an appropriate amount of hydrogen gas can be supplied appropriately to the fuel cell 2 in accordance with the load of the fuel cell 2. Note that similarly to the first embodiment, the branch passage 112 may be constituted by external piping on the outside of the ejector 24.

[Fourth Embodiment]

Figure 5:
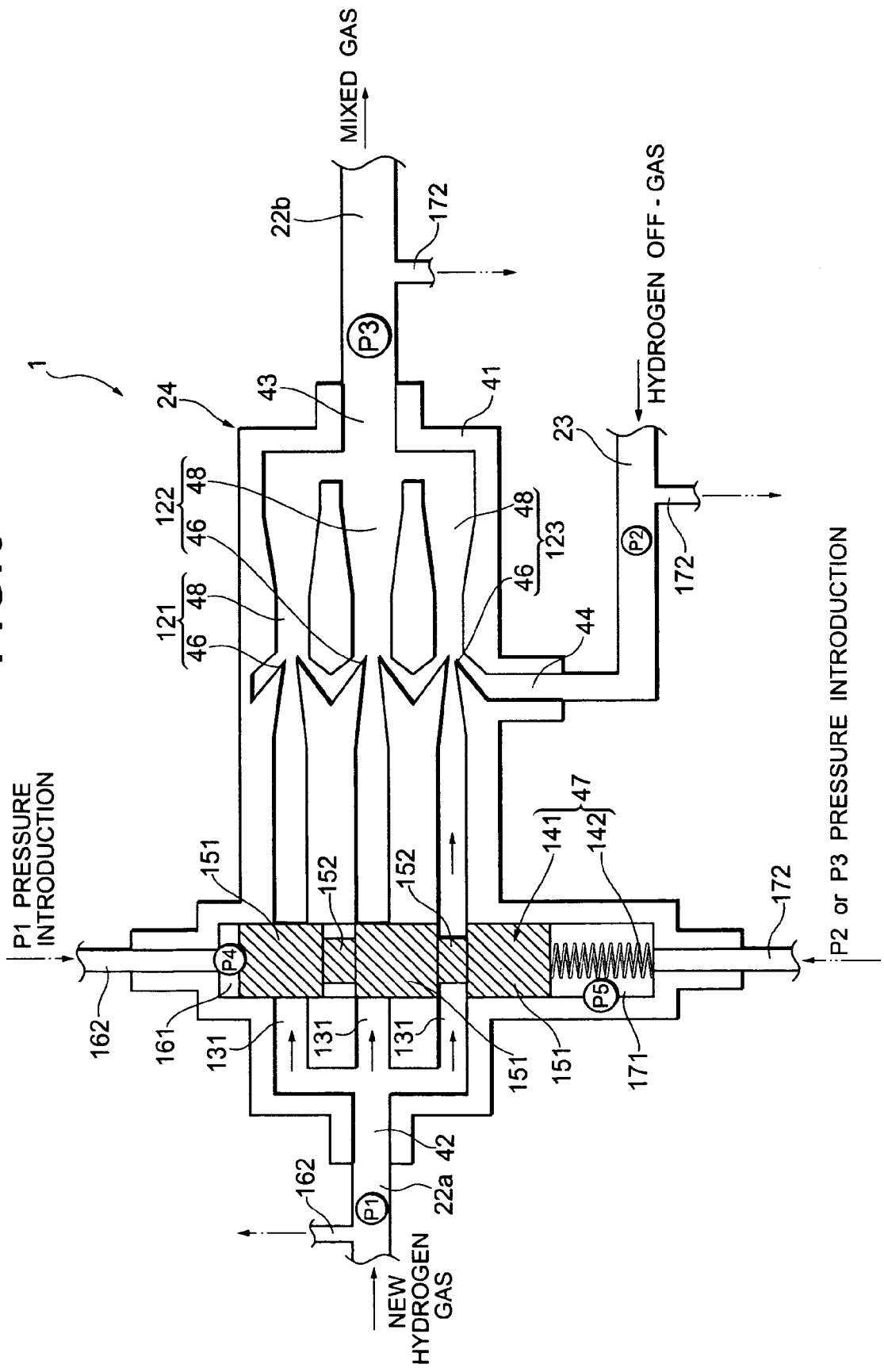
FIG. 5 is a simplified block diagram showing the main parts of a fuel cell system according to a fourth embodiment.

Next, referring to FIG. 5, a fourth embodiment of the fuel cell system 1 according to the present invention will be described, focusing on differences with the first embodiment. In fourth embodiment, the ejector 24 is provided with a multi-stage structure corresponding to the flow rate range of the new hydrogen gas. More specifically, the ejector 24 comprises three nozzles 46 provided in accordance with the flow rate of the new hydrogen gas, and three diffusers 48 provided on the downstream side of and coaxial with the respective nozzles 46. The three nozzles 46 and three diffusers 48 are arranged in vertical series.

Hence, in the ejector 24 of this embodiment, a first ejector portion 121 corresponding to a large hydrogen gas flow rate region is constituted by the nozzle 46 and diffuser 48 positioned on the upper side of the drawing. Similarly, a second ejector portion 122 corresponding to a medium hydrogen gas flow rate region is constituted by the nozzle 46 and diffuser 48 in the intermediate position, and a third ejector portion 123 corresponding to a small hydrogen gas flow rate region is constituted by the nozzle 46 and diffuser 48 positioned on the lower side of the drawing.

For example, the nozzle 46 and diffuser 48 of the first ejector portion 121 are formed with a larger inner diameter than the other ejector portions 122, 123 such that the flow rate of the new hydrogen gas which passes through the nozzle 46 is greatest.

The first, second, and third ejector portions 121, 122, 123 are incorporated into the single casing 41, and the upstream sides of the three nozzles 46 lead respectively to three branch passages 131 which bifurcate from the single main flow passage 22a inside the casing 41. The downstream sides of the three diffusers 48 converge into a single passage inside the casing 41, and this converging portion leads to the mixture passage 22b. The section between the nozzle 46 and diffuser 48 of the third ejector portion 123 is communicated with the tertiary side suction port 44. As shown in FIG. 5, the third ejector portion 123 communicates with the second ejector portion 122 between the nozzles 46 and diffusers 48 thereof, while the second ejector portion 122 communicates with the first ejector portion 121 between the nozzles 46 and diffusers 48 thereof.

The flow rate control mechanism 47 controls the flow rate of the new hydrogen gas by switching the three nozzles 46 (the three ejector portions 121, 122, 123) according to the differential hydrogen gas pressure to select one nozzle 46 (one ejector portion) through which transmission of the hydrogen gas is to be permitted. More specifically, the flow rate control mechanism 47 is constituted by a selector valve 141 and a spring 142. The selector valve 141 has three valve main bodies 151 capable of closing the branch passages 131, and two connecting portions 152 which connect the three valve main bodies 151 in a vertical direction and do not close the branch passages 131.

Each valve main body 151 is provided to be capable of sliding within the interior of the casing 41. New hydrogen gas from the main flow passage 22a is led through a flow path 162 (second flow path) to a main flow pressure chamber 161 defined by the uppermost valve main body 151 and the inner wall of the casing 41.

Meanwhile, mixed gas from the mixture passage 22b or hydrogen off-gas from the circulation passage 23 is led through a first flow path 172 (branch flow passage) to a branch flow pressure chamber 171 defined by the lowermost valve main body 151 and the inner wall of the casing 41. The spring 142 is provided in the branch flow pressure chamber 171, and biases the entire selector valve 141 in an upward direction via the lowermost valve main body 151.

Actions of the fuel cell system 1 of this embodiment will now be described, focusing on the relationship thereof to the load of the fuel cell 2. As shown in FIG. 5, when the amount of the power generation of the fuel cell 2 is comparatively small, the upper two valve main bodies 151 close the upper two branch passages 131 such that only the third ejector portion 123 functions. When the amount of the power generation of the fuel cell 2 increases from this state, the pressure P2 of the hydrogen off-gas falls, and at this time, the pressure P5 in the branch flow pressure chamber 171 decreases via the branch flow passage 172.

Thus the selector valve 141 is moved in a downward direction by the balance between P4, P5, and the biasing force of the spring 142. Here, if the new hydrogen gas need only be set to a medium flow rate, the lowered upper two valve main bodies 151 close the upper and lower branch passages 131 so that only the second ejector portion 122 functions. When the new hydrogen gas needs to be set to a large flow rate, the selector valve 141 descends further such that the upper two valve main bodies 151 close the lower two branch passages 131, and as a result, only the first ejector portion 121 functions.

In a large flow rate state, or in other words when the amount of the power generation of the fuel cell 2 decreases from a state in which only the first ejector portion 121 functions, the pressure P2 of the hydrogen off-gas rises, and at this time the pressure P5 in the branch flow pressure chamber 171 increases via the branch flow passage 172. Thus the selector valve 141 is moved in an upward direction by the balance between P4, P5, and the biasing force of the spring 142. Similarly, when the new hydrogen gas need only be set to a medium flow rate, only the second ejector portion 122 is operated, and when the new hydrogen gas needs to be set to a small flow rate, only the first ejector portion 121 is operated.

According to this embodiment, each ejector portion 121, 122, 123 is provided for a different flow rate region of the new hydrogen gas, and the flow rate of the new hydrogen gas is controlled by switching to a predetermined ejector portion appropriately in accordance with the differential pressure. Hence, in this embodiment also, flow rate control can be performed by the ejector 24 in accordance with the differential pressure of the hydrogen gas supply system 4, and an appropriate amount of hydrogen gas can be supplied to the fuel cell 2 appropriately in accordance with the load of the fuel cell 2.

Note that the selector valve 141 is incorporated into the casing 41 of the ejector 24, but needless to say, the selector valve 141 may be provided outside the casing 41 of the ejector 24. Further, the plurality of ejector portions 121, 122, 123 are provided in the single casing 41, but the ejector portions may be constituted independently. Moreover, in this embodiment the ejector portions are used one at a time in accordance with the hydrogen gas flow rate region, but a plurality of the ejector portions may be combined selectively. In other words, a plurality of the nozzles 46 may be selected according to the differential pressure. In this case, for example, the plurality of ejector portions may have identical capabilities, that is suction ability, or different capabilities, as described above. Further, in this embodiment a combination of new hydrogen gas and hydrogen off-gas or a combination of new hydrogen gas and mixed gas is used as the gas that is led to the flow rate control mechanism 47, but instead of this constitution, a combination of hydrogen off-gas and mixed gas, for example, may be used.

[Fifth Embodiment]

Figure 6:
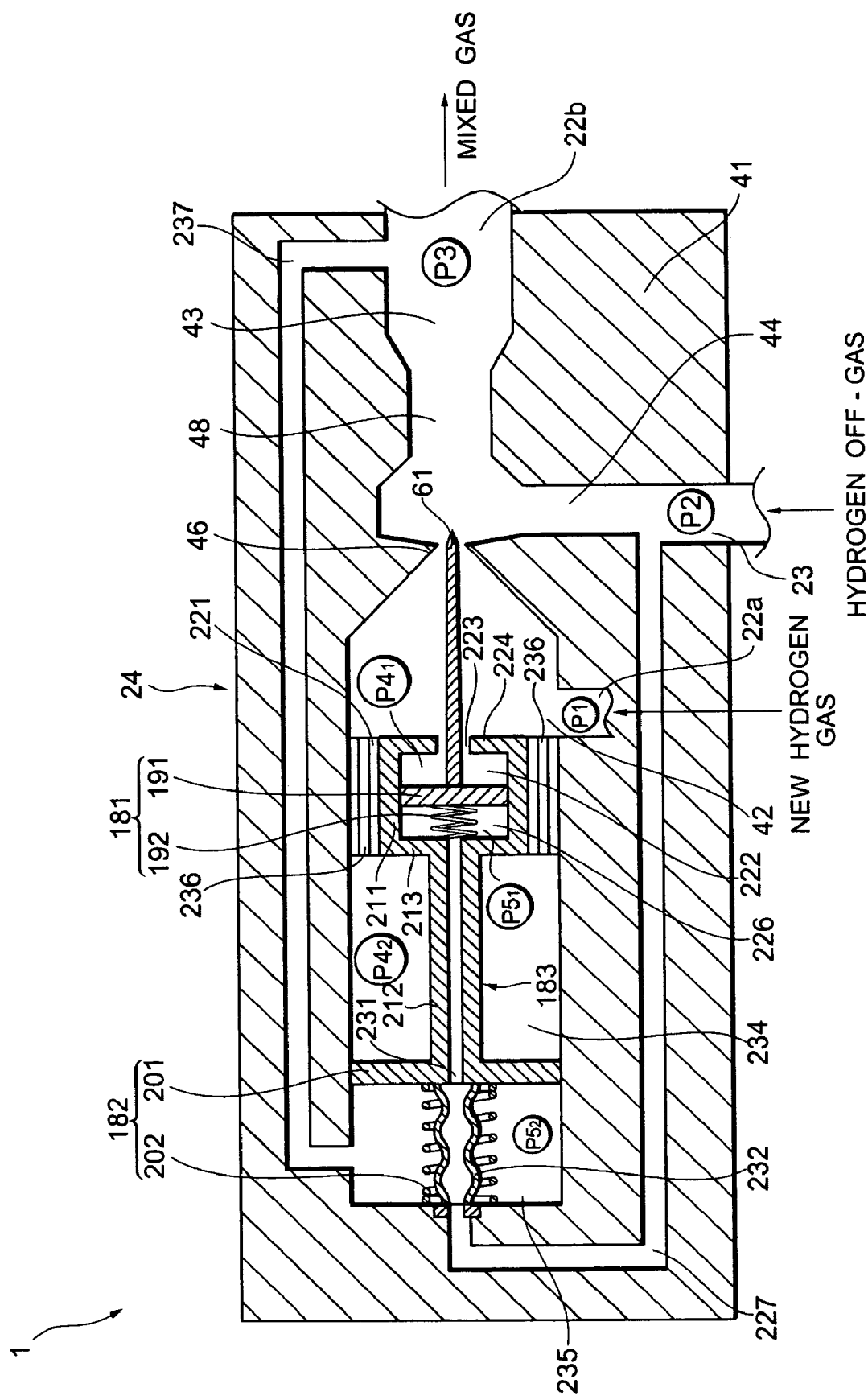
FIG. 6 is a simplified block diagram showing the main parts of a fuel cell system according to a fifth embodiment.

Next, referring to FIG. 6, a fifth embodiment of the fuel cell system 1 will be described, focusing on differences with the previous embodiments. In each of the previous embodiments, the ejector 24 comprises a single flow rate control mechanism 47 and controls the flow rate on the basis of a single differential pressure in the hydrogen gas supply system 4. In fifth embodiment, the ejector 24 controls the flow rate on the basis of a plurality of (two) differential pressures in order to achieve broad controllability, and for this purpose comprises a plurality of flow rate control mechanisms.

The ejector 24 comprises two flow rate control mechanisms constituted by a first flow rate control mechanism 181 and a second flow rate control mechanism 182, and similarly to the first embodiment comprises the casing 41, primary side supply port 42, secondary side discharge port 43, tertiary side suction port 44, the single tapered nozzle 46, and the single diffuser 48.

The first and second flow rate control mechanisms 181, 182 are constituted to share a part of the various members thereof such as the needle 61. The first flow rate control mechanism 181 mainly comprises a first piston 191 connected to the base end side of the needle 61, and a first spring 192 which biases the rear surface side of the first piston 191 toward the tip end side of the needle 61. The second flow rate control mechanism 182 mainly comprises a second piston 201 which is connected to the first piston 191 via a connecting member 183, and a second spring 202 which biases the second piston 201 toward the tip end side of the needle 61. These main constitutional members (191, 192, 183, 201, 202) of the first and second flow rate control mechanisms 181, 182 are disposed coaxial with the nozzle 46.

The connecting member 183 is constituted by a hollow, stepped round bar, for example. The connecting member 183 comprises a large diameter portion 211 which supports a periphery of the first piston 191 slidably, a small diameter portion 212 whose one end portion is fixed to the front surface side of the second piston 201, and an annular step portion 213 which links the other end portion of the small diameter portion 212 to the large diameter portion 211 integrally. Note that the periphery of the second piston 201 is supported slidably on the inner wall of the casing 41.

The outer periphery of the large diameter portion 211 is supported slidably on an annular guide portion 221 fixed to the inner wall of the casing 41. The interior of the large diameter portion 211 is defined to the left and right by the first piston 191. A first main flow gas chamber 222 on the right side of the drawing is defined principally by the front surface side of the first piston 191, a partition wall 224 which is disposed opposite the front surface side of the first piston 191 and has a gas introduction opening portion 223 which allows the needle 61 to advance and retreat, and the inner wall of the large diameter portion 211. A first branch flow gas chamber 226 on the left side of the drawing is defined principally by the rear surface side of the first piston 191, the annular step portion 213 disposed opposite the rear surface side of the first piston 191, and the inner wall of the large diameter portion 211. The aforementioned first spring 192 is provided in the first branch flow gas chamber 226.

New hydrogen gas from the main flow passage 22a is introduced into the first main flow gas chamber 222 via the gas introduction opening portion 223. Hydrogen off-gas from a first branch flow passage 227 which bifurcates from and is connected to the circulation passage 23 is introduced into the first branch flow gas chamber 226 via an internal passage constituted by the small diameter portion 212. More specifically, the first branch flow gas chamber 226 communicates with the internal passage of the small diameter portion 212 which communicates with an internal passage constituted by a passage forming member 232 via a through hole 231 formed in a central portion of the second piston 201. The internal passage of the passage forming member 232 communicates with the first branch flow passage 227.

The passage forming member 232 is constituted by a flexible, substantially tubular member, one end portion of which is fixed to the inner wall of the casing 41 and the other end portion of which is fixed to the rear surface side of the second piston 201. The passage forming member 232 is constituted to expand and contract in the advancement/retreat direction of the second piston 201 in response to the advancement and retreat of the second piston 201. Note that the passage forming member 232 is inserted into the interior of the second spring 202.

By means of this constitution, the first flow rate control mechanism 181 causes the needle 61 to advance and retreat via the first piston 191 in accordance with the balance between a pressure $P4_1$ in the first main flow gas chamber 222, a pressure $P5_1$ in the first branch flow gas chamber 226, and the biasing force of the first spring 192. In other words, the first flow rate control mechanism 181 controls the flow rate of the new hydrogen gas that passes through the nozzle 46 in accordance with the differential pressure between the pressure of the new hydrogen gas and the pressure of the hydrogen off-gas.

Note that a flow path (second flow path) for leading new hydrogen gas to the first flow rate control mechanism 181 (the first main flow gas chamber 222 thereof) is constituted principally by the main flow passage 22a. Further, a first flow path for leading hydrogen off-gas to the first flow rate control mechanism 181 (or the first branch flow gas chamber 226 thereof) is constituted principally by the first branch flow passage 227, the passage forming member 232, and the small diameter portion 212.

A second main flow gas chamber 234 and a second branch flow gas chamber 235 are provided in the interior of the casing 41 in relation to the second flow rate control mechanism 182 and defined to the left and right by the second piston 201. The second main flow gas chamber 234 is mainly defined by the front surface side of the second piston 201, a side face of the opposing annular stepped portion 213 and guide portion 221, and the inner wall of the casing 41. New hydrogen gas from the main flow passage 22a is introduced into the first main flow gas chamber 222 via a through passage 236 formed so as to penetrate the guide portion 221. In other words, a flow path for leading new hydrogen gas to the second main flow gas chamber 234 is constituted principally by the main flow passage 22a and the through passage 236.

The second branch flow gas chamber 235 is mainly defined by the rear surface side of the second piston 201 and the inner wall of the casing 41, including the wall surface opposing the rear surface side of the second piston 201. The second spring 202 and passage forming member 232 described above are provided in the second branch flow gas chamber 235. Mixed gas from a second branch flow passage 237 which bifurcates from and is connected to the mixture passage 22b is introduced into the second branch flow gas chamber 235. In other words, a flow path for leading the mixed gas to the second branch flow gas chamber 235 is constituted principally by the second branch flow passage 237.

By means of this constitution, the second flow rate control mechanism 182 causes the needle 61 to advance and retreat via the second piston 201, connecting member 183, and first piston 191, in that order, according to the balance between a pressure $P4_2$ in the second main flow gas chamber 234, a pressure $P5_2$ in the second branch flow gas chamber 235, and the biasing force of the second spring 202. In other words, the second flow rate control mechanism 182 controls the flow rate of the new hydrogen gas that passes through the nozzle 46 in accordance with the differential pressure between the pressure of the new hydrogen gas and the pressure of the mixed gas.

Actions of the fuel cell system 1 of this embodiment will now be described, focusing on the relationship of each of the first and second flow rate control mechanisms 181, 182 with the load of the fuel cell 2. When the amount of the power generation of the fuel cell 2 increases such that the pressure P2 of the hydrogen off-gas falls, the pressure $P5_1$, in the first branch flow gas chamber 226 decreases via the first branch flow passage 227 and so on. Therefore, the first flow rate control mechanism 181 causes the needle 61 to retreat in accordance with the balance between $P4_1$, $P5_1$, and the biasing force of the first spring 192. As a result, the opening area of the nozzle 46 increases, and the flow rate of the new hydrogen gas passing through the nozzle 46 rises.

As described above, when the amount of the power generation of the fuel cell 2 increases, the pressure P3 of the mixed gas falls, and at this time, the pressure $P5_2$ in the second branch flow gas chamber 235 decreases via the second branch flow passage 237. Therefore, the second flow rate control mechanism 182 causes the needle 61 to retreat in accordance with the balance between $P4_2$, $P5_2$, and the biasing force of the second spring 202. As a result, the opening area of the nozzle 46 increases, and the flow rate of the new hydrogen gas passing through the nozzle 46 rises.

On the other hand, when the amount of the power generation of the fuel cell 2 decreases such that the pressure P2 of the hydrogen off-gas rises, the pressure $P5_1$ in the first branch flow gas chamber 226 increases via the first branch flow passage 227 and so on. Therefore, the first flow rate control mechanism 181 causes the needle 61 to advance in accordance with the balance between $P4_1$, $P5_1$, and the biasing force of the first spring 192. As a result, the opening area of the nozzle 46 decreases, and the flow rate of the new hydrogen gas passing through the nozzle 46 falls.

Likewise, when the amount of the power generation of the fuel cell 2 decrease, the pressure P3 of the mixed gas rises, and at this time, the pressure $P5_2$ in the second branch flow gas chamber 235 increases via the second branch flow passage 237. Therefore, the second flow rate control mechanism 182 causes the needle 61 to advance in accordance with the balance between $P4_2$, $P5_2$, and the biasing force of the second spring 202. As a result, the opening area of the nozzle 46 decreases, and the flow rate of the new hydrogen gas passing through the nozzle 46 falls.

Hence in this embodiment also, flow rate control can be performed by the ejector 24 in accordance with the differential pressure in the hydrogen gas supply system 4, and an appropriate amount of hydrogen gas can be supplied to the fuel cell 2 appropriately in accordance with the load of the fuel cell 2. In particular, since the flow rate is controlled on the basis of two differential pressures, broad controllability can be achieved. Note that in this embodiment, the pressure combinations constituting the differential pressures comprise the new hydrogen gas and hydrogen off-gas, and the new hydrogen gas and mixed gas, respectively, but the combinations not limited thereto, and more than two combinations may also be used. For example, a combination of new hydrogen gas and mixed gas, and a combination of hydrogen off-gas and mixed gas may be employed.

[Sixth Embodiment]

Figure 7:
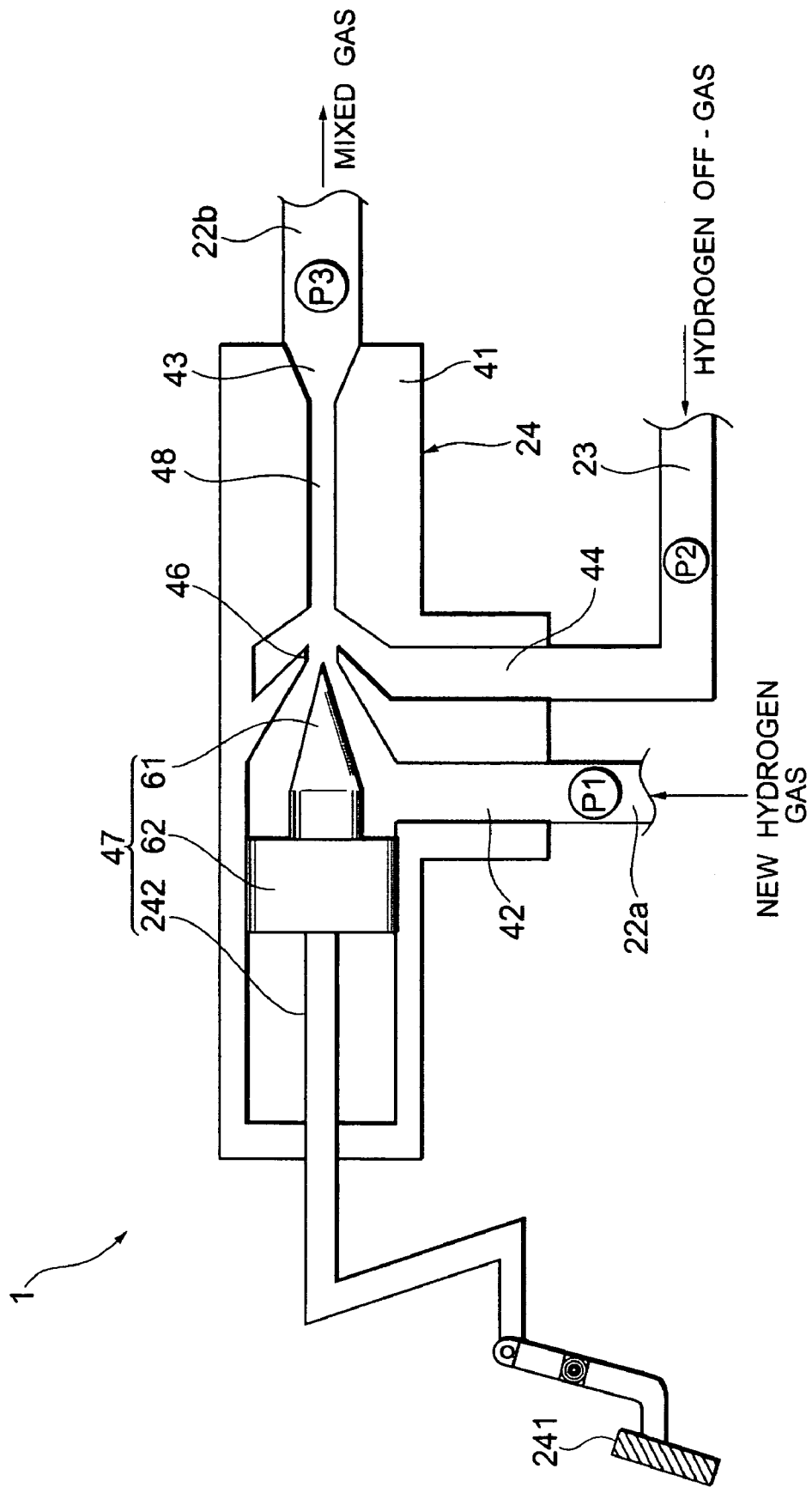
FIG. 7 is a simplified block diagram showing the main parts of a fuel cell system according to a sixth embodiment.

Next, referring to FIG. 7, a sixth embodiment of the fuel cell system 1 will be described, focusing on differences with the first embodiment. In sixth embodiment, the flow rate control mechanism 47 is constituted to cause the needle 61 to advance and retreat using the opening (depression amount) of an accelerator pedal 241 of the fuel cell vehicle, instead of causing the needle 61 to advance and retreat using the differential pressure of the hydrogen gas, as in the first embodiment.

More specifically, in addition to the accelerator pedal 241 and the needle 61, the flow rate control mechanism 47 includes the piston 62, to which the base end side of the needle 61 is fixed, and a power transmission mechanism including a wire 242 for connecting the piston 62 to the accelerator pedal 241, and so on. The power transmission mechanism is capable of varying the degree to which the needle 61 advances and retreats via the piston 62 on the basis of the depression amount of the accelerator pedal 241.

When the fuel cell vehicle accelerates (when the amount of the power generation of the fuel cell 2 increases) such that the depression amount of the accelerator pedal 241 increases, the piston 62 is caused to retreat by the power transmission mechanism, and hence the needle 61 retreats. As a result, the opening area of the nozzle 46 increases and the flow rate of the new hydrogen gas that passes through the nozzle 46 rises.

When the fuel cell vehicle decelerates (when the amount of the power generation of the fuel cell 2 decreases), on the other hand, such that the depression amount of the accelerator pedal 241 decreases, the piston 62 is caused to advance by the power transmission mechanism, and hence the needle 61 advances. As a result, the opening area of the nozzle 46 decreases and the flow rate of the new hydrogen gas that passes through the nozzle 46 falls.

Hence in this embodiment, the opening area of the nozzle 46 is varied by the flow rate control mechanism 47 on the basis of the depression amount of the accelerator pedal 241, and therefore an appropriate amount of gas can be supplied to the fuel cell 2 in accordance with the load of the fuel cell 2 without the need for electric actuators, sensors, and the like.

[Seventh Embodiment]

Next, referring to FIG. 8, a seventh embodiment of the fuel cell system 1 will be described. In seventh embodiment, the ejector 24 is disposed in the oxygen gas supply system 3. As shown in the drawing, the ejector 24 is disposed in the supply passage 12 on the upstream side of the humidifier 11. A primary side of the ejector 24 is connected to a main flow passage 12a leading from the compressor 15, a secondary side is connected to a mixture passage 12b leading to the humidifier 11, and a tertiary side is connected to the circulation passage 13.

New oxygen gas from the compressor 15 is combined with oxygen off-gas by the ejector 24, and the combined mixed gas is supplied to the fuel cell 2 via the humidifier 11. Note that a check valve 251 is interposed on the circulation passage 13 on the downstream side of the humidifier 11, and the oxygen off-gas is aspirated into the ejector 24 through the check valve 251. Needless to say, the location of the ejector 24 is not limited to that described above, and the ejector 24 may be disposed on the downstream side of the humidifier 11, for example.

Any of the constitutions described in the above embodiments may be employed as the ejector 24 of this embodiment. Also, two flow paths (the branch flow passages 71, 81, 112, 227, 237, etc.) leading to the flow rate control mechanism 47 of the ejector 24 may be provided in the oxygen gas supply system 3 of this embodiment. By disposing the ejector 24 in the oxygen gas supply system 3 and constituting the ejector 24 similarly to the manner described in the above embodiments, oxygen gas can be supplied appropriately in accordance with the load of the fuel cell 2, and the flow rate control executed by the ejector 24 at this time can be performed mechanically and autonomously, without the need for electric devices.

We claim:

1. A fuel cell system comprising:
an ejector that is disposed in a gas supply system, combines a new gas to be supplied to a fuel cell with a gas discharged from said fuel cell, and supplies said fuel cell with a resulting combined gas, wherein said ejector comprises:
a nozzle for ejecting said new gas and generating a negative pressure for aspirating said gas discharged from said fuel cell; and
a flow rate control mechanism for controlling a flow rate of said new gas which passes through said nozzle, wherein
said gas supply system includes a first flow path for leading said gas, which is discharged from said fuel cell and flows between said fuel cell and said ejector, to a base end side of said flow rate control mechanism,
said flow rate control mechanism controls said flow rate of said new gas in accordance with a pressure of the gas led from said first flow path, and
said first flow path is connected to a circulation passage which is disposed between said fuel cell and said ejector, and the first flow path branches directly from the circulation passage which leads said discharged gas to a tip end side of said flow rate control mechanism, opposite said base end side.

2. The fuel cell system according to claim 1, wherein
said gas supply system includes a second flow path which leads said new gas to said flow rate control mechanism, and
said flow rate control mechanism controls said flow rate of said new gas in accordance with a differential pressure of the gas from said first flow path and the gas from said second flow path.

3. The fuel cell system according to claim 1, wherein
said gas supply system includes a second flow path which leads said combined gas to be supplied to said fuel cell to said flow rate control mechanism, and
said flow rate control mechanism controls said flow rate of said new gas in accordance with a differential pressure of the gas from said first flow path and the gas from said second flow path.

4. The fuel cell system according to claim 2, wherein said flow rate control mechanism comprises:
a needle having a tip end side which faces an opening portion of said nozzle;
a piston connected to a base end side of said needle, said piston having a front surface side to which the gas from one of said first flow path and said second flow path is led and a rear surface side to which the gas from the other of said first flow path and said second flow path is led to; and
a biasing member for biasing said rear surface side of said piston toward said tip end side of said needle, and
said needle advances and retreats axially on the basis of a balance between said differential pressure of said gases on said piston and a biasing force of said biasing member, thereby varying an opening area of said nozzle.

5. The fuel cell system according to claim 2, wherein
said nozzle is provided in a plurality corresponding to said flow rate of said new gas, and
said flow rate control mechanism controls said flow rate of said new gas by switching said nozzles in accordance with said differential pressure to select one or a plurality of nozzles through which transmission of said new gas is to be permitted.

6. The fuel cell system according to claim 1, wherein
a passage sectional area of said first flow path is set to be smaller than that of said circulation passage.

7. The fuel cell system according to claim 1, wherein
said gas supply system is a hydrogen gas supply system.

* * * * *